United States Patent

Graham et al.

[15] 3,638,749
[45] Feb. 1, 1972

[54] VEHICLE CAB MOUNTING

[72] Inventors: Stanford G. Graham, Fort Wayne; Ernest R. Sewelin, Waterloo; Richard L. Staadt, Fort Wayne, all of Ind.; Jimmie D. Pinney, Phoenix, Ariz.

[73] Assignee: International Harvester Company, Chicago, Ill.

[22] Filed: Oct. 15, 1969

[21] Appl. No.: 866,594

[52] U.S. Cl. ................................180/68, 180/89
[51] Int. Cl. .........................................B60k 11/02
[58] Field of Search ............180/64 R, 64 M, 64 L, 68, 89; 267/57.1 A

[56] References Cited

UNITED STATES PATENTS

| 2,596,411 | 5/1952 | Jordan | 280/276 |
| 2,013,599 | 9/1935 | Butler | 180/57 |
| 2,740,487 | 4/1956 | Murty et al. | 180/89 |
| 3,420,568 | 1/1969 | Henriksson et al. | 296/35 |

Primary Examiner—Arthur L. La Point
Assistant Examiner—Robert Saifer
Attorney—Floyd B. Harman

[57] ABSTRACT

Motor truck body structure and radiator mounting means for resiliently supporting the engine heat exchanger or radiator and the vehicle body structure, which includes an operator's compartment, hood, fenders and radiator grille panel, on the chassis frame whereby such motor truck components and parts are movable in a controlled manner with respect to the chassis frame as a structural composite unit in order to mitigate the transmission of forces, shocks and vibrations thereto. The mounting means includes a subframe to which the aforesaid motor truck parts are directly connected and a single helically wound compression spring and shock absorber assembly for interconnecting the subframe and the chassis frame.

12 Claims, 7 Drawing Figures

VEHICLE CAB MOUNTING

The invention relates to a motor vehicle body structure and engine coolant radiator mounting means and, more particularly, to a new and improved connecting means and a unique arrangement of the components of such connecting means for resiliently supporting the motor truck cab, the front end sheet metal structure, such as the hood, fenders and radiator grille panel, and the engine coolant radiator on the chassis frame as a structural composite unit.

It is generally the practice in the motor truck design field to effectively mitigate the damaging influence of the torsional forces imposed on a chassis frame caused by one or more ground-engaging wheels being elevated differently than the others as when the vehicle is driven over an uneven terrain or road surface irregularity by providing a chassis frame which is relatively flexible and capable of relieving the torsional forces imposed thereon. Obviously, the forwardmost ends of the transversely spaced, longitudinally extending frame side sill members tend to move vertically with respect to each other a greater amount than the amount of relative movement produced between other related sections or portions of the flexible frame when the frame is subjected to torsional or twisting forces.

It will be appreciated that the former practice of securing the vehicle cab or operator's compartment, as well as the front end sheet metal work such as the hood, fenders and radiator grille panel, which is rigidly connected to the cab, directly to a chassis frame in such a manner that very little, if any, relative movement between the chassis frame and the front end sheet metal work was permitted had to be abandoned. Various ingenious mounting means have been devised for mounting the vehicle cab on the flexible chassis frame whereby the distorting forces and shocks to which the frame is subjected are not directly or fully transmitted to the vehicle cab to cause deformation and ultimate breakage of the sheet metal parts thereof as well as the mounting structures or parts for connecting the vehicle cab and front end sheet metal work to the chassis frame. However little or no consideration has been given to the problem of supporting the front end sheet metal work, particularly the hood, fenders and radiator grille panel, on the flexible frame which parts are also interconnected with the vehicle cab. Heretofore, it has been the usual practice in the motor truck industry to secure the radiator grille panel, hood and fenders directly to the frame in a relatively rigid manner. As a result, the vehicle cab was permitted to twist and bend with respect to the front end structure when the chassis frame was subjected to torsional forces causing deformation, fatigue and ultimate breakage of the sheet metal parts interconnecting the vehicle cab and the front end sheet metal structure as well as the connections of such front end sheet metal structure to the frame.

It has also been the practice in the motor truck industry to mount the engine coolant heat exchanger or radiator structure on the chassis frame forwardly of the engine and in a position where it is exposed to the air draft created by movement of the vehicle which air draft assists the draft created by the usual engine-driven cooling fan in order to insure adequate and efficient cooling of the engine coolant and thus the engine during operation of the vehicle in all atmospheric conditions. Since the engine in conventional motor truck installations is mounted at the forward end of the chassis frame, the radiator structure is secured to the forwardmost ends of the frame side sill members forwardly of and in longitudinal alignment with the engine where the maximum cooling efficiency of the radiator structure is obtained. Heretofore, it has been the usual practice in the motor truck industry to also secure the engine coolant radiator structure, like the vehicle cab or operator's compartment and the aforementioned front end sheet metal work discussed above, directly to the chassis frame in such a manner that very little, if any, relative movement was permitted between the chassis frame and such engine coolant radiator structure. Consequently, the radiator structure and certain of the above noted sheet metal parts were secured directly to that section of the chassis frame where relative movement is most pronounced when the frame was subjected to the aforementioned distorting forces and shocks and, as a result, the distorting forces and shocks were transmitted directly and fully to such sheet metal parts and the radiator structure causing deformation of the radiator core and the sheet metal parts of the body structure and ultimate breakage thereof. It is therefore an important object of the present invention to provide a novel means for interconnecting the engine coolant radiator structure and the aforesaid motor vehicle body structure together as a structural composite unit and to provide novel mounting means for connecting such structural composite unit to the chassis frame. The mounting means allows a limited but adequate relative movement between the structural composite unit and the chassis frame whereby the distorting forces, shocks, and vibrations to which the chassis frame is subjected are transmitted to the various components and parts of the structural composite unit to a lesser degree than heretofore possible.

In addition to the foregoing problem of mitigating the damaging influence of chassis frame twist on the vehicle body and radiator structures, motor truck designers are also confronted with the problem of providing a comfortable ride for the vehicle operator and any passengers. Part of the ride problem is due to the fact that commercial vehicles, such as motor trucks, are designed primarily for carrying pay loads which are heavy in comparison with the load normally carried by a pleasure car. Consequently, it is essential that the axle suspension units of motor trucks embody relatively stiff and heavy or high rate springs in order to properly support the heavy cargo loads. Because of the fact that the rate of the springs used in motor truck axle suspension units is relatively high, they are, consequently, ineffective to contribute to any great extent to driver comfort. Furthermore, the mounting means devised heretofore for mounting the vehicle cab on a relatively flexible chassis frame permitted the vehicle cab to roll or rock rather excessively with respect to the chassis frame. Obviously, such excessive rolling or rocking of the vehicle cab was imparted to the vehicle operator or driver in the form of rolling and rocking sensations which adversely affected his comfort to a considerable degree. It is, therefore, an object of the present invention to connect the vehicle body structure, which includes the operator's compartment, hood fenders and radiator grille panel, to the chassis frame in such a manner so as to allow a limited but adequate relative movement between the body and frame to prevent distortion of the body structure but which movement is transmitted to the vehicle operator to a lesser degree than heretofore possible.

A still further object is to provide means for minimizing the effect of cab roll, rock and shake on the vehicle operator.

One of the main purposes of the present invention is to afford an improved cushioned and more comfortable ride for the driver and passengers of a motor truck and this is accomplished by resiliently supporting the vehicle cab by means which includes a "low rate" spring located in an area nearly directly below the seating position of the driver and passengers which spring functions to absorb road shock from being transmitted to the vehicle cab. The cab supporting means also includes a shock absorber operably interconnecting the vehicle cab and chassis frame in such a manner that it dampens the tendency of the cab to bounce on the "low rate" spring. The cab supporting means also includes pivot connecting means for allowing the vehicle cab and front end sheet metal structure to ride freely on such "low rate" spring and be cushioned on it.

A still further object is to mount the vehicle cab and front end sheet metal structure, such as the fender hoods and radiator grille panel, on a sub or auxiliary frame and to connect the subframe to the chassis frame for controlled relative movement therebetween and to isolate the structural composite unit composed of the subframe, vehicle body, hood, fenders and radiator grille panel from the forces, shocks and vibrations to which the chassis frame is subjected.

A still further object is to provide means for connecting the forwardmost end portions of a subframe upon which subframe are mounted the vehicle cab, fenders, hood and radiator grille panel by a pair of transversely spaced pivot connection means, one of the pivot connection means including a link having one end pivotally connected to the subframe and its opposite end pivotally connected to a respective chassis frame side sill member.

A further object is to provide a novelly arranged track bar operatively interconnecting the subframe and the chassis frame for controlling relative movement between the subframe and chassis frame.

The foregoing and other important objects and desirable features inherent in and encompassed by the invention, together with many of the purposes and uses thereof, will become readily apparent from a reading of the ensuing description in conjunction with the annexed drawings, in which:

Referring to the drawings in detail, wherein like reference characters represent like elements throughout the various views, a motor truck frame structure, designated generally by numeral 10 and embodying the invention, is shown.

In a broad sense, the invention contemplates mounting certain vehicle components, which are designated in their entirety by reference character 11, upon the vehicle chassis frame 12 through the intermediary of an auxiliary or subframe 13. The vehicle components 11 are mounted on the subframe 13 and the subframe 13, in turn, is connected to the chassis frame 12 in such a manner so as to allow limited but adequate relative movement between the subframe 13 and the chassis frame 12. As a result, the vehicle components 11 are movable with respect to the chassis frame 12 as a structural composite unit in order to mitigate transmission of forces, shocks, and vibrations thereto. The chassis frame 12 includes a pair of longitudinally extending, laterally spaced side sill members 14 and 15 having a conventional U-shaped or channel form. The side sill members 14 and 15 are interconnected by a plurality of longitudinally spaced, laterally extending crossmembers, only one of such crossmembers 16 being shown in FIG. 2.

The vehicle components 11, which in conjunction with the subframe 13 comprise the structural composite unit, includes a heat exchanger or radiator structure 11A for cooling the liquid engine coolant. The radiator structure 11A is mounted on the subframe 13 forwardly of and substantially in longitudinal alignment with an internal combustion engine (not shown) as in conventional installations to obtain maximum cooling efficiency of the radiator structure 11a without the need of complicated and costly duct work. The vehicle components 11 also include sheet metal body structure, illustrated somewhat diagrammatically in FIG. 7, which comprises an operator's compartment or cab, designated in its entirety by reference character 11B. Connected to the operator's compartment 11B and extending forwardly therefrom is a hood structure 11C. The hood structure 11C encloses the engine or power plant (not shown). A pair of fenders 11D are attached at respective opposite sides of the hood structure 11C. Suitably secured to the forward extremity of the hood structure 11C is a vertically disposed radiator grille panel 11E.

Figures 2, 7:
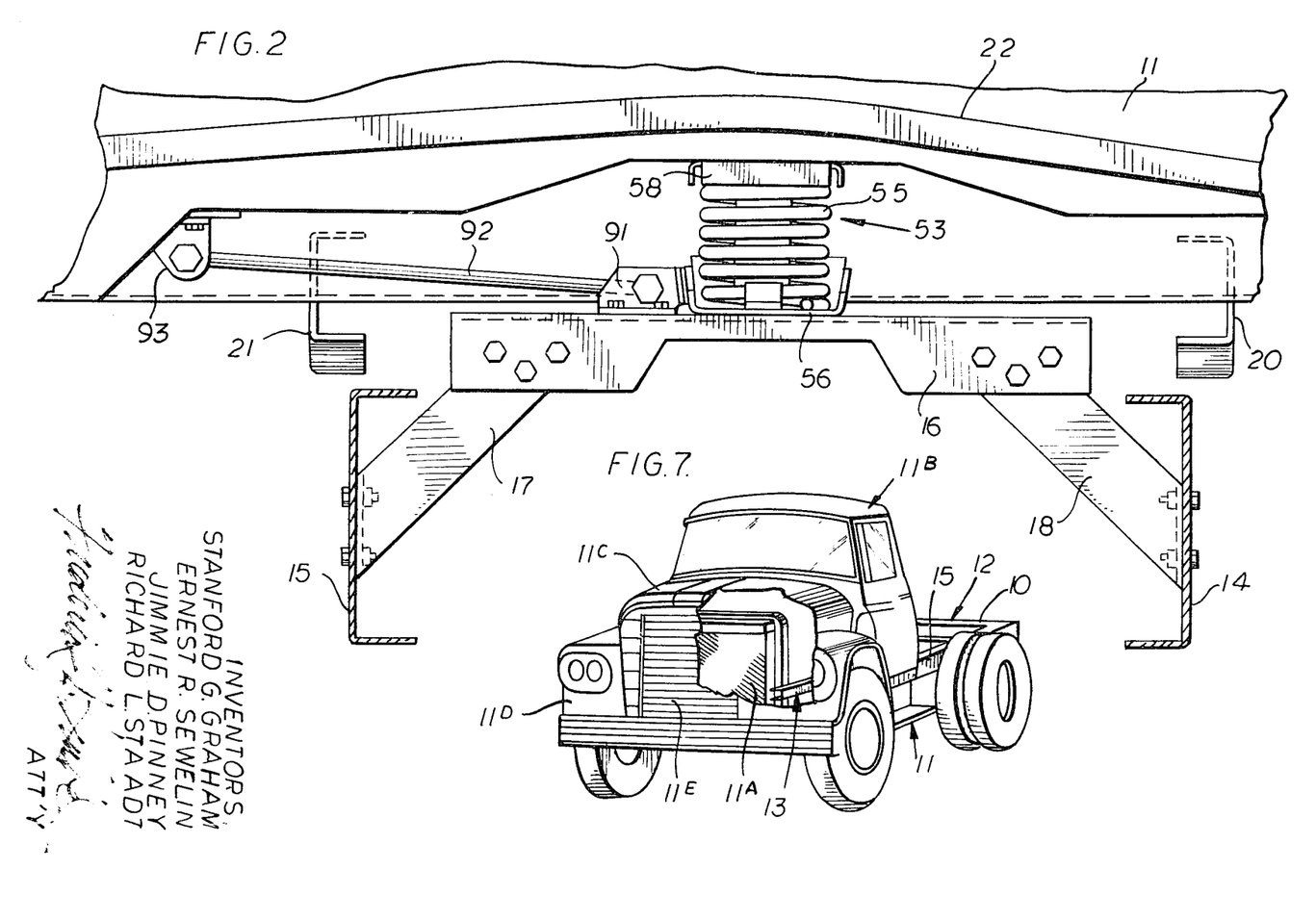
FIG. 2 is a vertical sectional view of the motor vehicle structure shown in FIG. 1 taken substantially along line 2—2 of FIG. 1.
FIG. 7 is a perspective view taken from the front and one side of the motor truck embodying the invention; a portion of the vehicle sheet metal structure is broken away to better illustrate the invention.

As will be observed from FIG. 2, the laterally extending crossmember 16 of the chassis or main frame 12 is elevated slightly above the upper surfaces of the side sill members 14 and 15 and is attached thereto by brackets 17 and 18 secured at each end of the crossmember 16 by suitable means such as bolts for example. The brackets 18 and 17, in turn, have their upper ends secured to the side sill members 14 and 15, respectively, by bolts or other suitable means. The main or chassis frame 12 is adapted to have operatively associated therewith ground-engaging wheels which are mounted on axle means (not shown). The axle means are connected to the chassis frame 12 by conventional resilient axle suspension units or assemblies (not shown).

The subframe 13 comprises a pair of longitudinally extending transversely spaced side sill members 20 and 21 interconnected at the rearwardmost end thereof by a transversely extending crossmember 22. Other intermediately disposed transversely extending crossmembers also may interconnect the side sill members 20 and 21 of the subframe 13. In addition to the laterally extending crossmembers, a hood and radiator frame unit 23 interconnects the side sill members 20 and 21 at the forward ends thereof and thus forms a part of the subframe 13. The side sill member 21 of the subframe 13 is disposed above and closely adjacent the side sill member 15 of the chassis frame 12 and, similarly, the side sill member 20 of the subframe 13 is disposed above and closely adjacent the side sill member 14 of the chassis frame 12.

The hood and radiator frame unit 23 comprises a substantially U-shaped radiator core support member 24, of generally channel construction, for supporting the radiator 11A therein and a generally inverted, substantially U-shaped support member 25 which is relatively larger than the support member 24 and is also of channel construction. Preferably, the support members 24 and 25 lie in the same vertical plane. The depending leg portions 28 and 29 of the support member 25 are spaced laterally outwardly from the upstanding leg portions 26 and 27, respectively, of the support member 24. The vertically upstanding leg portions 26 and 27 of the U-shaped support member 24 and the vertically depending leg portions 28 and 29 of the support member 25 are interconnected by transversely extending members 30 and 31. The transversely extending member 30 is preferably bolted to the lower end of the depending leg portion 28 and to the upstanding leg portion 26 (see FIG. 5), and the transversely extending member 31, likewise, is bolted to the lower end of the depending leg portion 29 and to the upstanding leg portion 27 (see FIG. 4). The transversely extending member 30 is of a generally U-shaped or channel construction and provides a receptaclelike support into which the forward end of the side sill member 20 of the subframe 13 may extend. This makes it possible to secure the side sill member 20 to the transversely extending member 30 by bolts 32 or other suitable fastening means. The transversely extending member 31 similarly is of a generally U-shaped construction and provides a receptaclelike support for the forward end of the side sill member 21 of the subframe 13. The side sill member 21 may thus be secured to the transversely extending member 31 by bolts 33 or other suitable fastening means.

Figure 1:
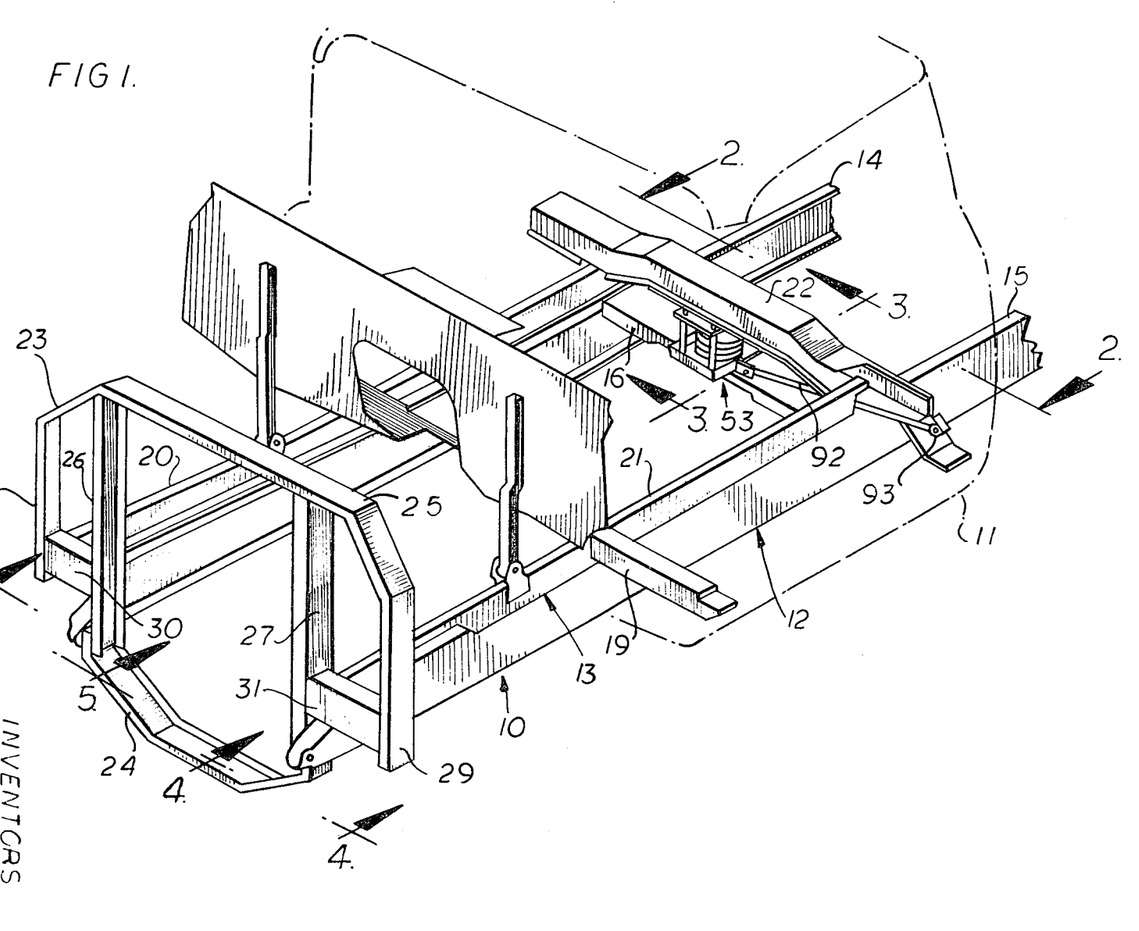
FIG. 1 is a somewhat diagrammatic, perspective view showing the general arrangement of certain components of a motor vehicle embodying the invention.
Figure 5:
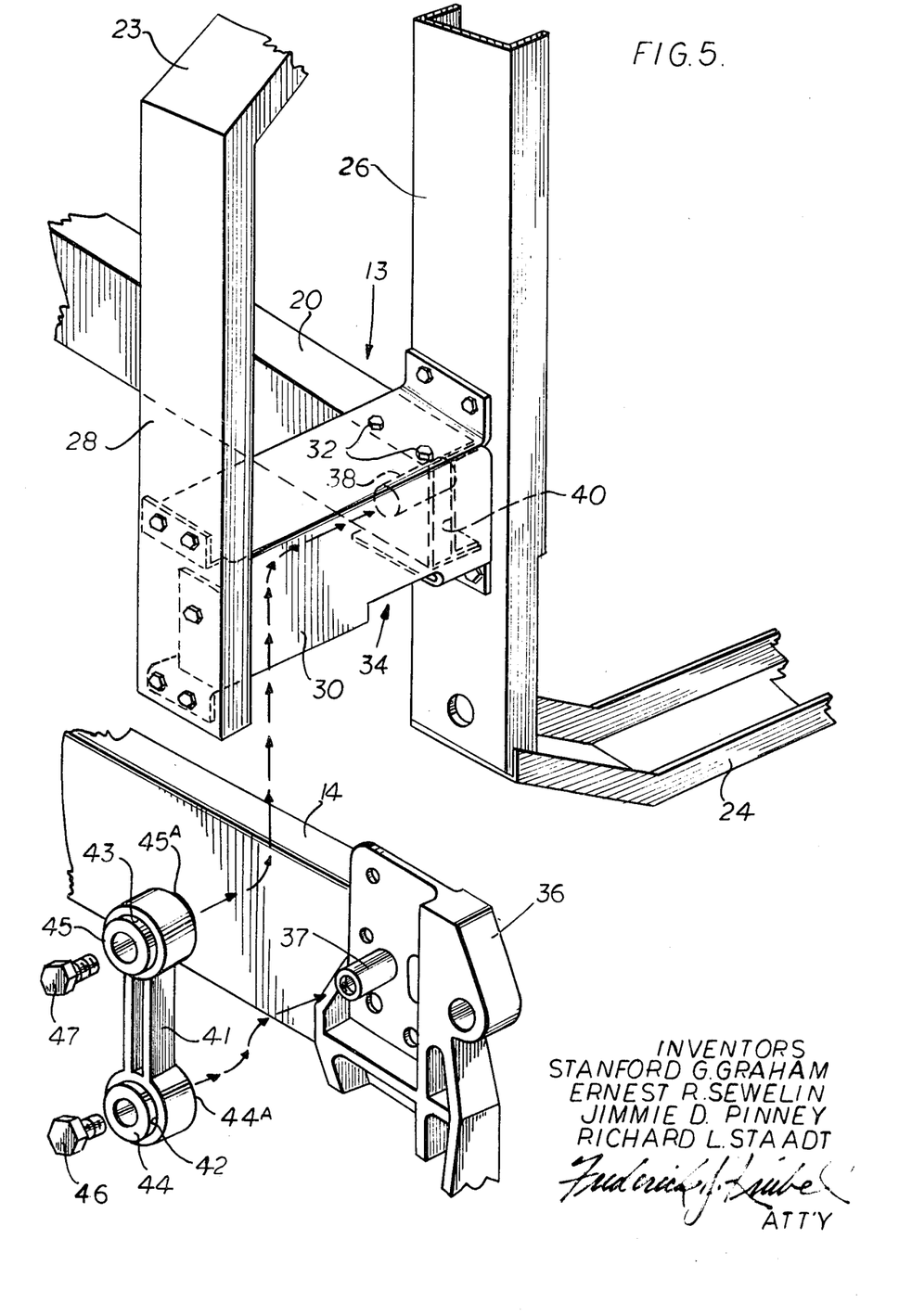
FIG. 5 is an enlarged exploded view in perspective similar to FIG. 4 with the exception that it is taken substantially along line 5—5 of FIG. 1 illustrating the pivotal connection between the chassis frame and the subframe on the opposite side looking from the front toward the rear of the chassis frame.

The subframe 13 has its forwardmost end supported on the chassis frame 12 by pivotal mounting means and has its rearward end mounted on the chassis frame 12 by means of a rear mounting unit comprising a coiled spring and shock absorber assembly. The pivotal mounting means includes a pair of pivotal mounting assemblies 34 and 35. The assembly 34, which is disposed on the left hand of the vehicle as viewed in FIG. 7, includes a bracket 36 secured by bolts or other suitable means to the outer face of the forward end of the chassis frame side sill member 14. The bracket 36 also serves as the front hanger bracket for the front axle spring (not shown) of the front axle spring suspension. A pivot pin 37 is supported in the bracket 36 or in both the bracket 36 and the member 14 and extends transversely to the outside of the chassis frame 12, as seen in FIG. 5. The assembly 34 also includes a similar transversely extending pivot pin 38 supported in the forward end of the subframe side sill member 20. A reenforcing bracket or support member 40 may be disposed within the end of the subframe side sill member 20 to provide additional support for the pivot pin 38. The assembly 34 further comprises a link 41 having bore 42 and 43 formed in the ends thereof to accommodate resilient bushings or insulators 44, 44A, 45, and 45A of rubber or other material having similar physical characteristics. As seen from FIG. 5, the bushings 44, 44A encircle the pivot pin 37 and in a similar fashion the sleevelike rubber bushings or insulators 45, 45A encircle the upper pivot pin 38. By interposing the rubber bushings 44, 44A, 45, 45A between the pivot pins 37, 38 and the ends of the link 41, the connected parts are effectively insulated and limited pivotal relative movement therebetween by deformation of the rubber bushings is allowed. A suitable securing means, such as the bolts 46 and 47, are provided to secure the link 41 in place on the pivot pins 37 and 38. From the foregoing, it will be appreciated that the assembly 34 is effective to firmly connect the left front side, as viewed in FIG. 1, of the subframe 13 to the chassis frame 12 but yet permits limited relative movement of the subframe 13 with respect to the chassis frame 12.

Figure 4:
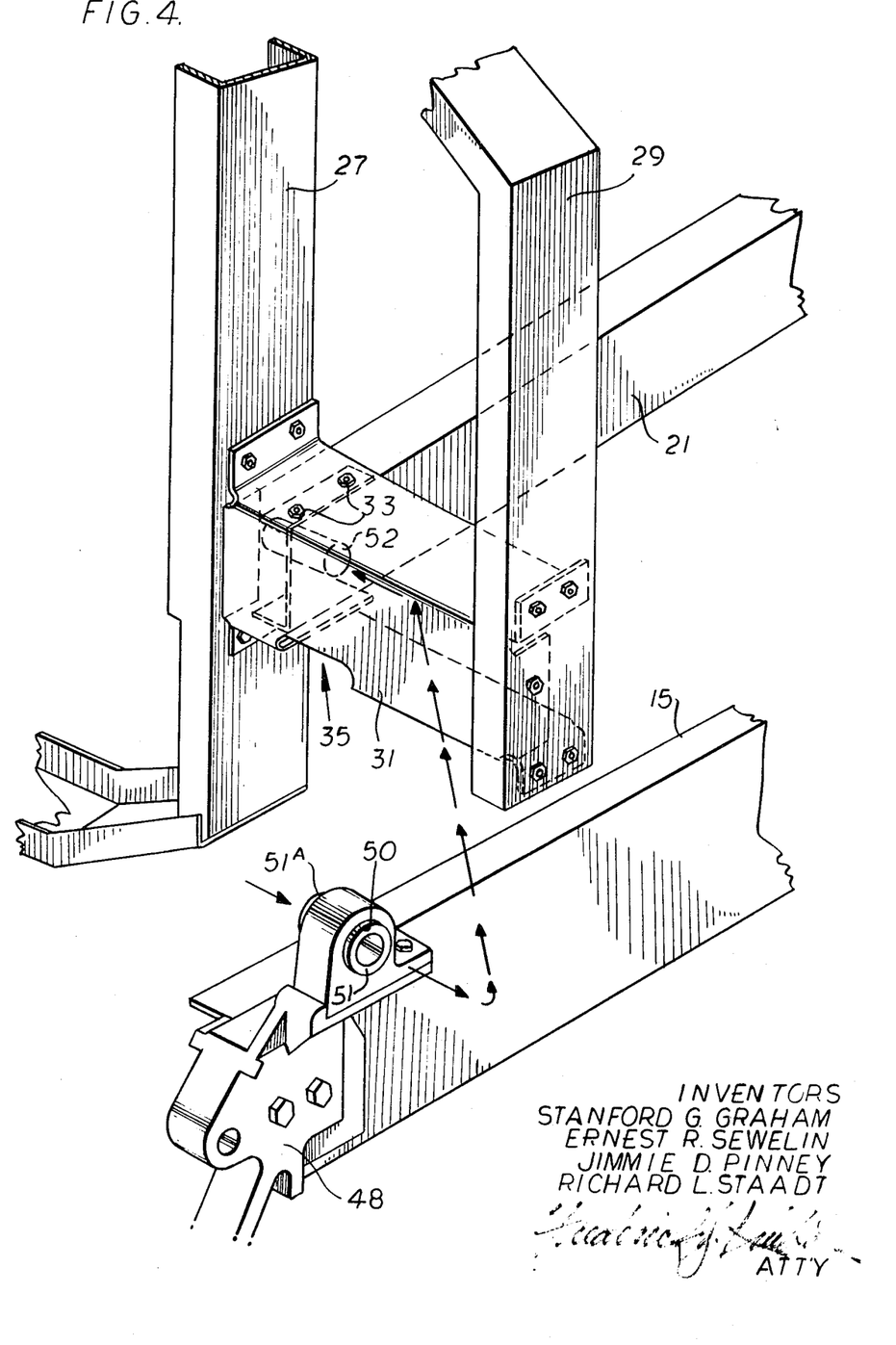
FIG. 4 is an enlarged exploded view in perspective taken substantially along line 4—4 of FIG. 1 showing the pivotal connection between the chassis frame and the subframe on one side of the chassis frame looking from the front to the rear thereof.

The pivotal mounting assembly 35 on the right side of the chassis frame, when viewed from the front, and as seen in FIG. 4, includes a bracket 48, which also serves as the front spring bracket for the spring (not shown) of the front axle spring suspension, secured by bolts or other suitable fastening means to the outer face of the forward end of the chassis frame side sill member 15. A bore 50 is formed in the upper portion of the bracket 48 and such bore is adapted to receive and support therein a pair of sleevelike resilient bushings or insulators 51 and 51A made of rubber or similar material. The support or pivotal mounting assembly 35 also includes a single transversely extending pivot pin 52 which is suitably supported in the side sill member 21 of the subframe 13 or in both the side sill member 21 and leg portion 27. The bushings 51 and 51A are adapted to receive and encircle the pivot pin 52. The surface defining the bore 50 and the pivot pin 52 tightly engage the interposed rubber bushings or insulators 51 and 51A upon securement of the assembly by bolt means similar to that used in connection with the link 41.

It is to be understood that the longitudinal axes of the pivot pins 38 and 52, disposed on respective opposite sides of the subframe 13, are in transverse and horizontal alignment. From the foregoing, it will also be appreciated that the pivotal mounting assemblies 34 and 35 allow a limited amount of flexibility between the chassis frame 12 and the subframe 13. The subframe 13 is capable of limited vertical rocking movement about the common axis extending through the pivot pins 38 and 52 as well as limited horizontal swinging movement about a vertical axis perpendicular to the longitudinal axis of the pivot pin 52 and extending through such pivot pin 52. The latter relative movement of the subframe 13 with respect to the chassis frame 12 is accomplished by compression of portions of rubber bushings 51 and 51A concurrently with the swinging of the link 41 about the pivot pin 37. Hence, it will be apparent that the means for mounting the forwardmost end of the subframe 13 on the chassis frame 12 permits the subframe 13 to move relatively to the chassis frame 12 in preestablished directions and thus any flexing of the chassis frame 12 imposes very little strain upon the subframe 13. Thus, since the vehicle components 11 are mounted on the subframe 13 and are movable relatively to the chassis frame 12 along with the subframe 13 as a structural composite unit, the possibility of damage caused to the vehicle cab 11B and the other parts of the vehicle components 11 is mitigated.

The aforedescribed front support mounting assemblies 34 and 35 function in conjunction with a rear mounting unit, designated generally by reference character 53, to achieve the objects of the invention set forth hereinbefore. The rear mounting unit 53 is adapted to support the rearwardmost portion of the subframe 13 on the chassis frame 12. The rear support mounting unit 53 is interposed between and interconnects the crossmember 16 and 22 of the chassis frame 12 and subframe 13, respectively. The rear support mounting unit 53 is spaced substantially midway between the side sill members 14 and 15 along the longitudinal centerline of the chassis frame 12. In essence, the rear support mounting unit 53 includes a shock absorber assembly 54 a helically wound compression spring member 55, a lower spring retainer bracket assembly 56, a shock absorber upper mounting bracket 57, and an upper spring retainer plate 58.

Figure 6:
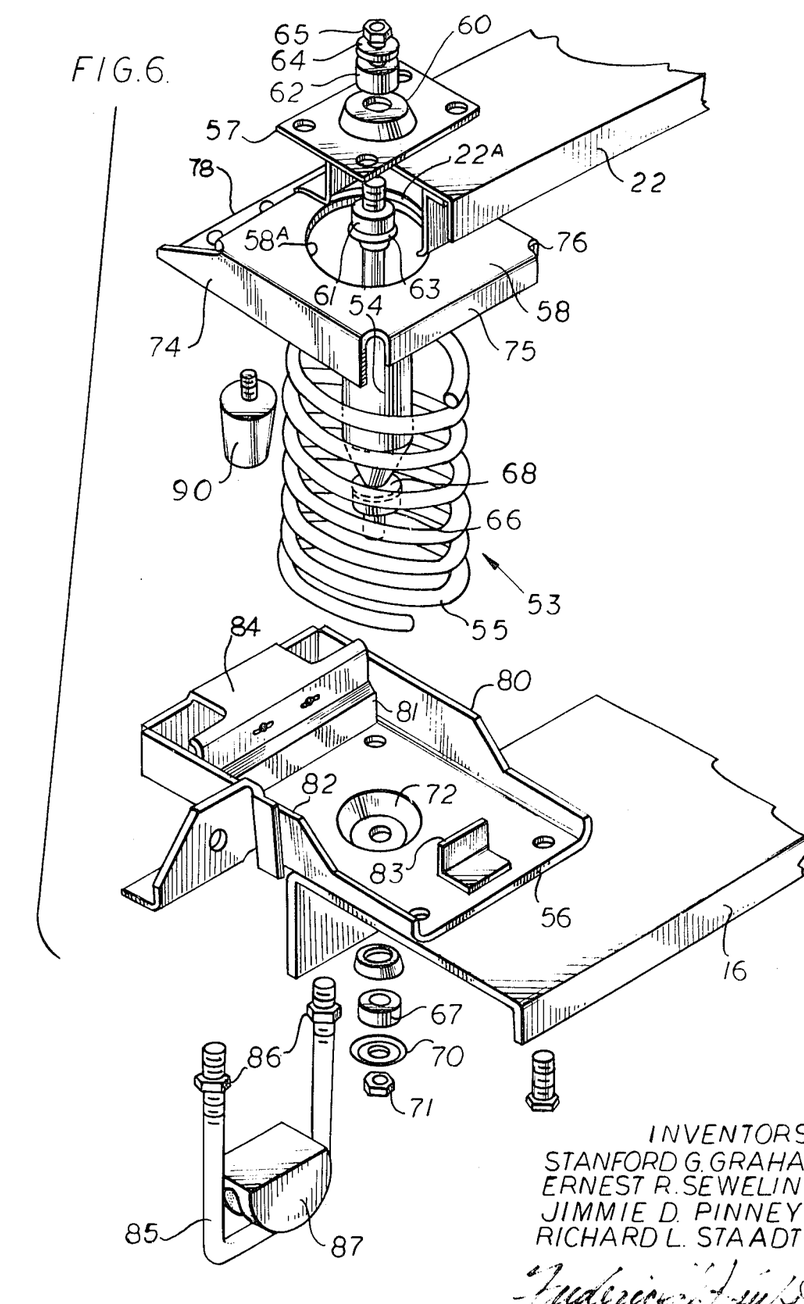
FIG. 6 is an enlarged exploded view in perspective of the rear mounting structure interconnecting the chassis frame and the subframe.

The lower bracket assembly 56 is rigidly secured to the upper face of the crossmember 16 of the chassis frame 12 by bolts or other suitable fastening means. The shock absorber upper mounting bracket 57 is similarly secured to the upper surface of the crossmember 22 of the subframe 13 as illustrated in FIG. 6. The shock absorber assembly 54, which extends vertically and centrally through the compression spring member 55, is preferably of the telescoping type. The normally uppermost end of the shock absorber assembly 54 is secured to the upper mounting bracket 57 by the cooperative action of rubber cushions 61 and 62 disposed on respective opposite sides of the upper mounting bracket 57, cushion retaining members 63 and 64, and a lock nut 65. It will be observed from FIG. 6 that the upper mounting bracket 57 is formed with an upwardly extending, dish-shaped portion 60 which serves as a seat for receiving the rubber cushion 61. Openings 58A and 22A are provided in the plate 58 and the crossmember 22, respectively, to permit the upper end of the shock absorber assembly 54 to extend therethrough. The lower end of the shock absorber assembly 54 is similarly secured to the lower bracket assembly 56 by the cooperative action of rubber cushion 66 and 67, cushion retaining members 68 and 70, and locknut 71.

Figure 3:
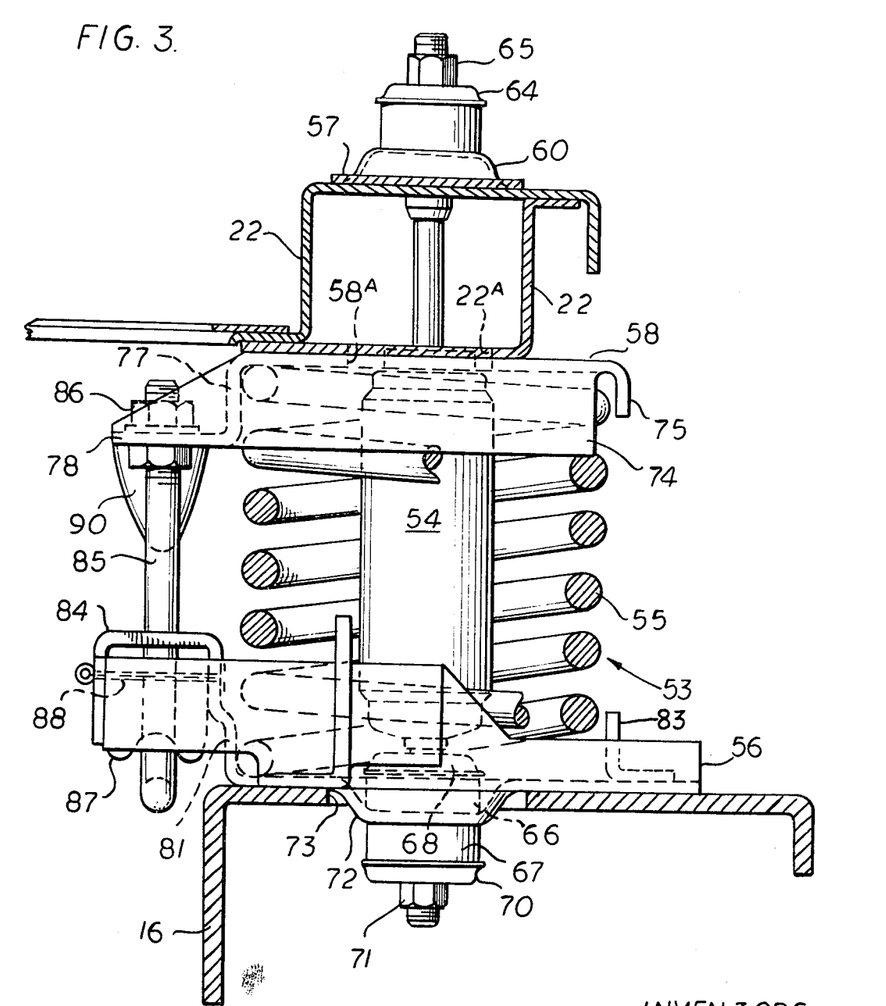
FIG. 3 is an enlarged vertical sectional view taken substantially along line 3—3 of FIG. 1 illustrating the mounting structure utilized for interconnecting the rearwardmost end of the subframe to the chassis frame.

It will be noted that the lower spring retainer bracket assembly 56 has a downwardly extending, dish-shaped portion 72 formed therein to provide a seat for the rubber cushion 66 at the lower end of the shock absorber assembly 54. An aperture 73 is formed through the transversely extending crossmember 16 to accommodate the dish-shaped portion 72, as shown in FIG. 3. As will be observed from FIGS. 3 and 6, the upper spring retainer plate 58 is formed with depending flanges 74, 75, 76 and 77 at the outer periphery thereof which serves to confine the upper end of the helically wound compression spring 55. A laterally extending flange portion 78 is attached to flange 77 for a purpose which will be described hereinafter.

The lower spring retainer bracket assembly 56 has upstanding flanges 80, 81, 82 and 83 formed thereon or connected thereto to confine the lower end of the helically wound compression spring 55. The flange 81 is extended into an inverted U-shaped bracket portion 84, as illustrated in FIG. 3.

The spring rate of the helically wound compression spring 55 is relative "low" as pointed out hereinbefore, and the spring 55 is located below and lies substantially in a vertical plane containing the seats normally occupied by the operator and passenger during operation of the motor truck. The spring 55 encircles the shock absorber assembly 54 and is disposed between the bracket assembly 56 and the retainer plate 58 in a preloaded or slightly compressed state.

As pointed out hereinbefore, an important object of the present invention is to provide an improved cushioned and more comfortable ride for the vehicle operator and any passengers and this is partially achieved by locating the "low spring rate" spring 55 in the position noted above and as illustrated in FIG. 1. The spring 55 absorbs road shock and prevents the same from being transmitted to the vehicle cab 11B. It will be evident from the above-described structures that the front pivotal mounting assemblies 34 and 35 allow the subframe 13 and all of the vehicle components 11 mounted thereon to ride freely on the rear mounting unit 53 and be cushioned on it. The subframe 13 acts like a platform which supports the entire vehicle cab 11B and the other vehicle components 11 including the radiator 11A as a structural composite unit. The front pivotal mounting assemblies 34 and 35 function in conjunction with the rear mounting unit 53 to allow the subframe 13 and all of the vehicle components 11 mounted thereon to ride freely on the comparatively "soft" spring 55 and be cushioned on it. The subframe 13 acts like a platform which supports the vehicle cab 11B and other vehicle components 11 including the radiator 11A as a structural composite unit and such structural composite unit is, in effect, isolated by the above-described mounting system from the road shocks and vibrations to which the chassis frame is subjected during operation of the vehicle.

The shock absorber assembly 54 dampens the tendency of the subframe 13, and thus the operator's compartment 11B, to bounce on the relatively "soft" spring 55.

It will be evident from the foregoing that the rear end of the subframe 13 is capable of moving relatively to the chassis frame 12 in a vertical direction by pivoting about a transversely extending axis passing through the pivot pins 38 and 52. Furthermore, as pointed out hereinbefore, the helically wound compression spring 55 is intended to be comparatively "soft" so as to isolate the subframe 13 and the vehicle components 11 mounted thereon from road shocks and vibrations. As a result the means for supporting the rear end of the subframe 13 as described above may allow more relative movement of the subframe 13 under certain operating conditions than is desired. In order to compensate for this eventuality, resilient stop means are provided to positively limit such relative movement. The resilient stop means includes a U-bolt 85 which is adapted to interconnect the lower bracket assembly 56 and the upper spring retainer plate 58. The U-bolt extends through openings in the bracket portion 84 and the laterally extending flange 78. The U-bolt 85 is secured to extend flange 78 by means of lock nuts 86. A block or bumper 87 of resilient cushioning material, such as rubber or the like, is confined in the inverted U-shaped bracket portion 84 and is secured in place by suitable means such, as for example cotter pins 88 which extend through the resilient cushioning bumper 87 and the depending legs of the bracket portion 84. The bight portion of the U-bolt 85 is positioned within a groove formed in the bumper 87. As stated herebefore, the spring 55 is slightly preloaded and such preloading of the spring 55 is accomplished by adjusting the locknuts 86 on the threaded leg portions of the U-bolt 85. It will be appreciated that preloading of the spring 55 causes the bight portion of the U-bolt 85 to be firmly seated within the groove of the bumper 87. It will also be appreciated that excessive relative movement of the rear end of the subframe 13 vertically away from the chassis frame 13 is prevented by the U-bolt 85 and the bumper 87.

Excessive movement of the rear end of the subframe 13 vertically downwardly with respect to the chassis frame 12 is prevented by means of a depending bumper 90 of resilient cushioning material such as rubber or the like. The bumper 90 is preferably tapered or generally conically shaped and is provided with a threaded metal shank projecting from one end thereof. Suitable means including the threaded shank are employed for fastening the bumper 90 to the laterally extending flange portion 78 so that it depends from the underside thereof. As shown in FIG. 3, the bumper 90 is substantially in vertical alignment with the bracket portion 84 and is thus in a position to engage such bracket portion 84 during excessive movement of the flange portion 78 downwardly or toward the bracket portion 84. It will be appreciated that the bumper 90 positively yet resiliently limits excessive relative movement between the chassis frame 12 and the rear end of the subframe 13 in one direction. By tapering the bumper 90, the resulting "spring rate" of the spring 55 and the bumper 90 when the bumper 90 is brought into action, may be controlled so as to afford a gradual rate change, as distinguished from an abrupt, sudden rate change, to take place as the rear end of the subframe 13 approaches the chassis frame 12.

Although the front pivotal mounting assemblies 34 and 35 permit the rear end of the subframe 13 to move laterally about a substantially vertical axis normal to and intersecting the longitudinal axis of pivot pin 52, as pointed out hereinbefore, it is desirable to control such allowable relative movement of the subframe 13 with respect to the chassis frame 12 within extremely close limits. It will also be appreciated that the rear mounting unit 53, per se, is incapable of controlling such relative movement and, therefore, track bar means are provided for this purpose. The track bar means, which will be described in detail presently, prevents undue lateral movement of the subframe 13 with respect to the chassis frame 12, while simultaneously controlling or guiding vertical movement of the rear end of the subframe 13 with respect to the chassis frame 12. The track bar means includes a track bar inner bracket 91 integrally formed with or rigidly attached to the lower spring retainer bracket 56. A transversely extending, rodlike track bar 92 has one end pivotally connected to the inner bracket 91 so as to be capable of swinging with respect to the bracket 91 about a substantially horizontal, longitudinally extending axis. The opposite end of the track bar 92 is similarly pivotally connected to an outer bracket 93 which is rigidly secured to the subframe crossmember 22 adjacent one end thereof.

From the foregoing description, it is believed obvious that the mounting system of the present invention effectively isolates the subframe 13 and all of the vehicle components 11 mounted thereon from the road shocks and vibrations to which the chassis frame 12 is subjected. The mounting system also minimizes the transfer of destructive forces to the vehicle cab 11B and the other vehicle components 11 caused by twisting or weaving of the chassis frame side sill members 14 and 15. The subframe 13 and the attached vehicle cab 11B are resiliently and flexibly mounted on the chassis frame 12 and the mounting system is intended to and does have a cushioning and dampening effect on the movement of the operator's compartment 11B with respect to the chassis frame 12. The subframe 13 is capable of pivoting in a vertical plane relative to the chassis frame 12 about an axis extending through the pivotal mounting assemblies 34 and 35 at the forward end of the chassis frame 12. A limited amount of lateral relative pivotal movement between the subframe 13 and the chassis frame 12 is also possible by virtue of the cojoint action of the rubber bushings employed at the pivot pins 37, 38 and 52 and the link 41.

What is claimed is:

1. In a motor vehicle having a chassis frame provided with a pair of transversely spaced, longitudinally extending sill members and a subframe, the combination including said chassis frame and subframe comprising, means for connecting said subframe to said chassis frame for controlled relative movement therebetween including pivotal mounting means securing one end of said subframe to said chassis frame whereby said subframe is capable of rocking vertically about a generally horizontal, transversely extending axis and horizontally about a substantially vertical axis perpendicular to a horizontal plane containing said generally horizontal, transversely extending axis, said vertical axis being disposed adjacent to one of said sill members; and means for yieldably resisting rocking of said subframe with respect to said chassis frame including a mounting unit interposed between said chassis frame and subframe and having one end operatively engaging said chassis frame and its other end operatively engaging said subframe, said mounting unit including a single, generally vertically extending, helically wound compression spring having one end supported by said chassis frame and having its opposite end operatively engaging said subframe at the end thereof opposite said pivotal mounting means, said compression spring being transversely spaced substantially midway between said side sill members.

2. In a motor vehicle as set forth in claim 1, wherein said mounting unit further includes a shock absorber assembly encircled by said compression spring, said shock absorber assembly having one end operatively connected to said subframe and its opposite end operatively connected to said chassis frame.

3. In a motor vehicle as set forth in claim 1, wherein said pivotal mounting means includes a pair of transversely spaced pivotal mounting assemblies, each of said pivotal mounting assemblies including a transversely extending pivot pin substantially in horizontal and transverse alignment with the pivot pin of the other pivot mounting assembly and wherein said generally horizontal, transversely extending axis about which said subframe is capable rocking extends through said pivot pins.

4. In a motor vehicle as set forth in claim 3, wherein said mounting unit further includes a shock absorber assembly, said shock absorber assembly being encircled by said compression spring and having its ends operatively connected respectively to said chassis frame and said subframe.

5. In a motor vehicle as set forth in claim 4, further including an oprator's compartment and an engine coolant radiator structure, said operator's compartment and radiator structure being mounted on said subframe and being movable in unison therewith relatively to said chassis frame.

6. In a motor vehicle as set forth in claim 5, wherein one of said pivotal mounting assemblies includes only a single one of said pivot pins and the other one of said pivotal mounting assemblies additionally including a second pivot pin fixed to said chassis frame having its longitudinal axis spaced and substantially parallel to the longitudinal axis of the first-mentioned pivot pin thereof, and a link having one end pivotally connected to said second pivot pin for swinging movement with respect to said chassis frame substantially about said longitudinal axis of said second pivot pin.

7. In a motor vehicle as set forth in claim 6, further including bushing means of resilient material interposed between each of said pivot pins of both of said pivotal mounting assemblies and the structure in which said pivot pins are journaled said bushing means being deformable to permit said limited relative horizontal pivotal movement between said chassis frame and said subframe about said substantially vertical axis perpendicular to the horizontal plane containing said generally horizontal, transversely extending axis.

8. In a motor vehicle as set forth in claim 7, wherein said vertical axis passes through the pivot pin of said one of said pivotal mounting assemblies which includes only a single one of said pivot pins.

9. In a motor vehicle as set forth in claim 8, wherein said operator's compartment is provided with seating means for the motor vehicle operator and passengers, and said mounting unit is disposed substantially below said seating means; and track bar means operatively interconnecting said chassis frame and subframe for simultaneously controlling relative rocking of said chassis frame and said subframe about said generally horizontal, transversely extending axis and relative pivoting of said chassis frame and said subframe about said substantially vertical axis.

10. In a motor vehicle as set forth in claim 9, wherein said track bar means includes an elongated track bar having one end pivotally connected to said subframe adjacent a transverse side edge thereof and its opposite end pivotally connected to said chassis frame adjacent said mounting unit.

11. In a motor vehicle as set forth in claim 10, wherein the pivotal axes of the pivotal connections of said track bar with said subframe and said chassis frame are substantially horizontally disposed and extend longitudinally with respect to said chassis frame.

12. In a motor vehicle as set forth in claim 11, further including resilient stop means for limiting relative rocking movement of said subframe with respect to said chassis frame about said generally horizontal, transversely extending axis in one direction; and second resilient stop means for limiting rocking movement of said subframe with respect to said chassis frame about said generally horizontal, transversely extending axis in the opposite direction.

* * * * *